United States Patent
Mizuno

[19]

[11] Patent Number: 5,989,608
[45] Date of Patent: Nov. 23, 1999

[54] FOOD CONTAINER FOR COOKING WITH MICROWAVE OVEN

[76] Inventor: Maki Mizuno, 1-6-17 Kaminoge, Setagaya-Ku, Tokyo 158-0093, Japan

[21] Appl. No.: 09/115,697

[22] Filed: Jul. 15, 1998

[51] Int. Cl.[6] .............................. A21D 10/02; A21D 6/00; B65D 45/00; H05B 6/74
[52] U.S. Cl. ..................... 426/113; 426/118; 426/237; 220/203.1; 220/245; 220/367.1; 220/745; 219/735
[58] Field of Search ...................................... 426/106, 113, 426/237, 118, 107; 220/367.1, 203.1, 745, 245; 219/757, 735

[56] References Cited

U.S. PATENT DOCUMENTS

| | | | |
|---|---|---|---|
| 4,490,597 | 12/1984 | Mengel | 219/10.55 E |
| 4,640,838 | 2/1987 | Isakson et al. | 426/107 |
| 5,363,978 | 11/1994 | Molo | 220/254 |
| 5,587,192 | 12/1996 | Beizermann | 426/118 |
| 5,665,408 | 9/1997 | Coupe et al. | 426/116 |
| 5,750,967 | 5/1998 | Sprauer, Jr. | 219/735 |

FOREIGN PATENT DOCUMENTS

| | | |
|---|---|---|
| 59-31590 | 9/1984 | Japan . |
| 62-69466 | 5/1987 | Japan . |
| 63-54672 | 4/1988 | Japan . |
| 2-49986 | 10/1990 | Japan . |
| 6-15880 | 4/1994 | Japan . |
| 6-329179 | 11/1994 | Japan . |
| 7-22547 | 3/1995 | Japan . |

*Primary Examiner*—Nina Bhat
*Attorney, Agent, or Firm*—Oblon, Spivak, McClelland, Maier & Nuestadt, P.C.

[57] ABSTRACT

A food container for cooking through use of a microwave oven includes a container adapted to contain food and having a hole and a pressure regulation valve attached to the food container to close the hole. The pressure regulation valve includes a cover film having an area sufficient to cover the hole, an adhesive layer applied over the surface of the cover film facing the food container, and a separator film disposed between the adhesive layer and the food container and having an area larger than that of the hole but smaller than that of the cover film. When food contained in the container is cocked in a microwave oven, the food is heated so that moisture is produced from the food. Until the vapor pressure within the food container reaches a predetermined level, the pressure regulation valve remains closed. When the vapor pressure within the food container reaches the predetermined level, the cover film partially separates from the food container in order to relieve the vapor pressure. The pressure regulation valve may include a gas-permeable film for preventing hot liquid from spouting from the hole of the container.

8 Claims, 11 Drawing Sheets

FOOD CONTAINER FOR COOKING WITH MICROWAVE OVEN

BACKGROUND OF THE INVENTION

1. Field of the Invention

The present invention relates to a food container suitable for cooking through use of a microwave oven.

2. Description of the Related Art

Figure 1A:
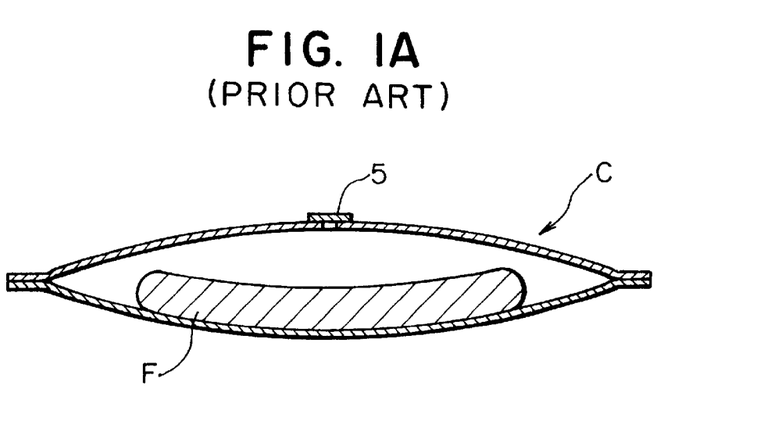
FIGS. 1A–1D are views showing a conventional food container.
Figure 1B:
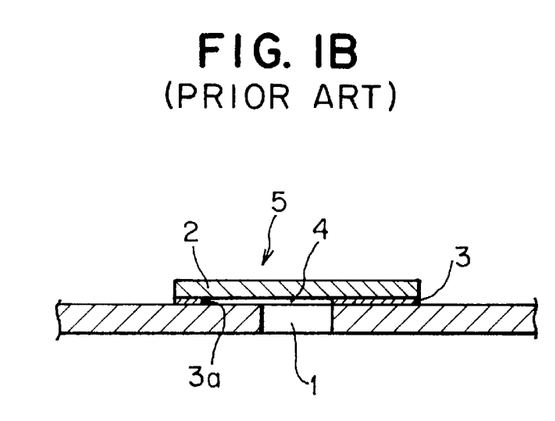
Figure 1C:
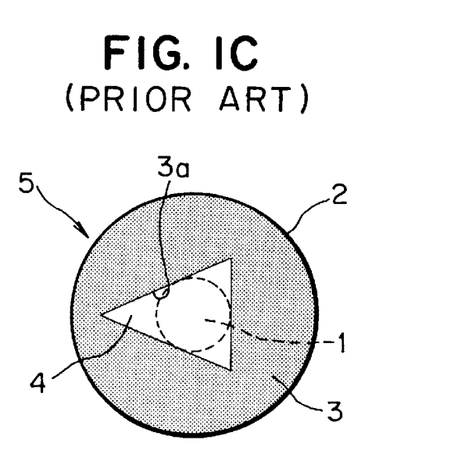

Japanese Patent Application Laid-Open No. 6-329179 discloses a food container suitable for cooking through use of a microwave oven. As shown in FIGS. 1A–1C, the food container has a small hole 1, and a circular cover film 2 is attached to the container via an adhesive layer 3 in order to cover the hole 1. In the adhesive layer 3 is formed a triangular non-adhesive area 4. In this way, the small hole 1, the cover film 2, and the adhesive layer 3 constitute a pressure regulation valve 5.

Figure 1D:
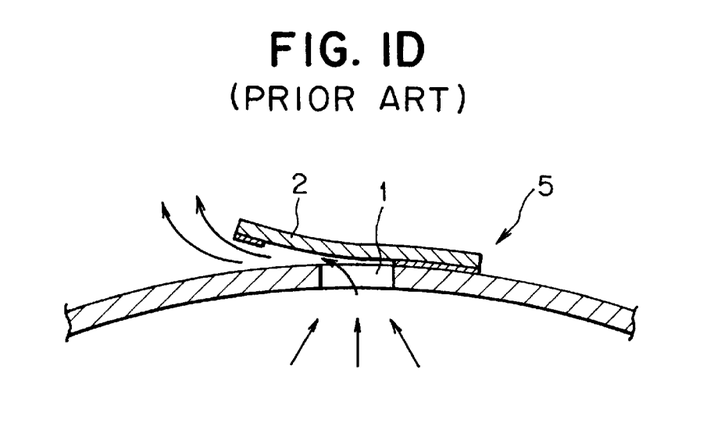

When the food container containing food therein is cocked in a microwave oven, the food is heated so that moisture is produced from the food. Until the vapor pressure within the food container reaches a predetermined level, the pressure regulation valve 5 remains closed. When the vapor pressure within the food container reaches the predetermined level, as shown in FIG. ID, the sheet 2 partially separates from the food container in order to relieve the vapor pressure. Thus, the food is cooked in a desirable manner. Also, the package container is prevented from bursting due to the vapor pressure.

However, in the conventional food container, the inner circumferential surface 3a of the adhesive layer 3 is exposed to the atmosphere within the container containing a large amount of moisture. Therefore, during long-time storage, the adhesive force of the adhesive layer 3 may be deteriorated, resulting in improper operation of the pressure regulation valve. Further, chemicals contained in the adhesive layer 3 may dissolve and enter the interior of the container, possibly imparting an odor to the food.

In addition, if food contained in the food container produces liquid during cooking, the liquid may spout through the hole and dirty the interior of a microwave oven.

SUMMARY OF THE INVENTION

In view of the foregoing, an object of the present invention is to provide an improved food container for microwave cooking which has a pressure regulation valve which is reliable and can be manufactured easily.

Another object of the present invention is to provide an improved food container for microwave cooking that can prevent hot liquid from spouting from a hole formed in the food container.

Briefly, the present invention provides a food container for cooking through use of a microwave oven, comprising a container adapted to contain food and having a hole and a pressure regulation valve attached to the container to close the hole, wherein the pressure regulation valve includes a cover film having an area sufficient to cover the hole; an adhesive layer applied over the surface of the cover film facing the container; and a separator film disposed between the adhesive layer and the container and having an area larger than that of the hole but smaller than that of the cover film.

Preferably, the pressure regulation valve is formed as a unit in advance and is attached to the container after formation of the hole in the container. This facilitates production of the container. In this case, the separator film is preferably formed through printing.

In the food container of the present invention, since the separator film is disposed between the cover film and the food container, the adhesive layer is not directly exposed to the interior of the food container. Therefore, even when food is placed in the food container and the food container is stored for a long time, the adhesive force of the adhesive layer does not decrease due to moisture, so that the pressure regulation valve provides a proper operation for a longer period of time.

The present invention also provides a food container for cooking through use of a microwave oven, comprising a container adapted to contain food and having a hole and a pressure regulation valve attached to the container to close the hole, wherein the pressure regulation valve includes a gas-permeable film having an area sufficient to cover the hole and adapted to prevent passage of water while allowing passage of air; a cover film having an area sufficient to cover the gas-permeable film and having a stationary peripheral portion corresponding to the peripheral portion of the gas-permeable film and a valve portion corresponding to the central portion of the gas-permeable film; and an adhesive layer disposed between the cover film and the container to bond the cover film to the container with the gas-permeable film interposed therebetween, wherein a non-adhesive area is formed in the adhesive layer at a position corresponding to the valve portion of the cover film.

Preferably, the pressure regulation valve is formed as a unit in advance, and is attached to the container after formation of the hole in the container.

In the food container of the present invention has the same advantages as those of the above-described food container of the present invention. In addition, since the gas-permeable film is provided at the outer side of the hole, hot liquid is prevented from spouting through the hole even when food contained in the food container is cooked in a microwave oven.

The present invention further provides a food container for cooking through use of a microwave oven, comprising a container adapted to contain a food and having a hole, and a pressure adjustment valve attached to the container to close the hole, wherein the pressure regulation valve includes a gas-permeable film having an area sufficient to cover the hole and adapted to prevent passage of water while allowing passage of air; a first adhesive layer disposed between the gas-permeable film and the container in order to bond the first gas-permeable film to the container; a cover film having an area sufficient to cover the gas-permeable film; a second adhesive layer disposed between the cover film and the gas-permeable film in order to bond the cover film to the gas-permeable film; and a separator film disposed between the second adhesive layer and the gas-permeable film and having an area larger than that of the hole but smaller than that of the cover film.

In the food container of the present invention, since the gas-permeable film is provided at the outer side of the hole, hot liquid is prevented from spouting through the hole even when food contained in the food container is cooked in a microwave oven.

The present invention further provides a food container for cooking through use of a microwave oven, comprising a container adapted to contain food and having a hole and a pressure regulation valve attached to the container to close the hole, wherein the pressure regulation valve includes a gas-permeable film having an area sufficient to cover the hole and adapted to prevent passage of water while allowing passage of air; a cover film having an area sufficient to cover the gas-permeable film and having a stationary peripheral portion corresponding to the peripheral portion of the gas-permeable film and a valve portion corresponding to the central portion of the gas-permeable film; an adhesive layer disposed between the cover film and the container to bond the cover film to the container with the gas-permeable film interposed therebetween; and a separator film disposed between the adhesive layer and the gas-permeable film and having an area larger than that of the hole but smaller than that of the valve portion of the cover film.

Preferably, the pressure regulation valve is formed as a unit in advance, and is attached to the container after formation of the hole in the container.

In the food container of the present invention has the same advantages as those of the above-described food container of the present invention. In addition, since the gas-permeable film is provided at the outer side of the hole, hot liquid is prevented from spouting through the hole even when food contained in the food container is cooked in a microwave oven.

Preferably, the pressure regulation valve is formed as a unit in advance, and is attached to the container after formation of the hole in the container.

The food containers of the present invention may further comprise an electrically conductive film for browning food through burning.

In the specification, the term "food container" encompasses all kinds of containers for containing food for storage, such as bags and boxes that may or may not have a lid.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE EMBODIMENTS

Embodiments of the present invention will be described with reference to the drawings.

First Embodiment

Figure 2A:
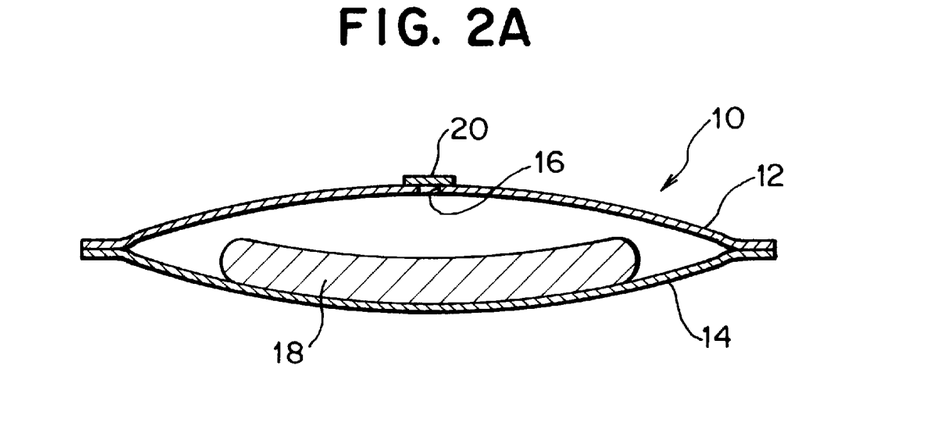
FIG. 2A is a cross-sectional view of a food container according to a first embodiment of the present invention.
Figure 2B:
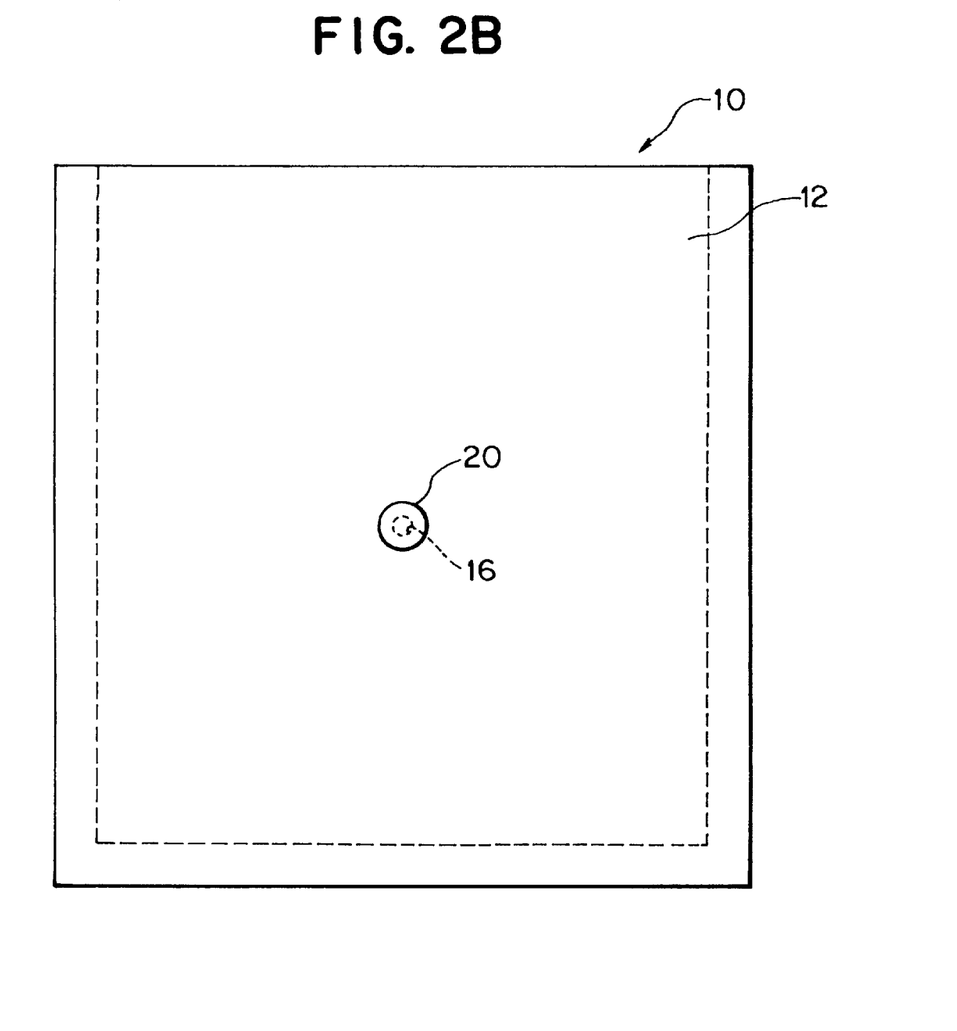
FIG. 2B is a plan view of the food container according to the first embodiment of the present invention.

FIGS. 2A and 2B show a food container 10 according to a first embodiment of the present invention. The food container 10 is a transparent bag and is formed of two resin sheets 12 and 14. The resin sheets are bonded along three sides with one side left unsealed in order to form an opening of the food container 10. The sheets 12 and 14 may be formed of any kind of polymer sheet having strength and heat resistance sufficient for microwave cooking. For example, a layered sheet of L-LDPE (linear low density polyethylene) film and O-Ny (oriented nylon) film is preferably used as the sheets 12 and 14.

A circular hole 16 is formed in the upper sheet 12 at the center thereof. The hole 16 has a diameter of, for example, 3 mm. Numeral 20 denotes a pressure regulation valve that is attached to the outer surface of the upper sheet 12 to close the hole 16.

Figure 3A:
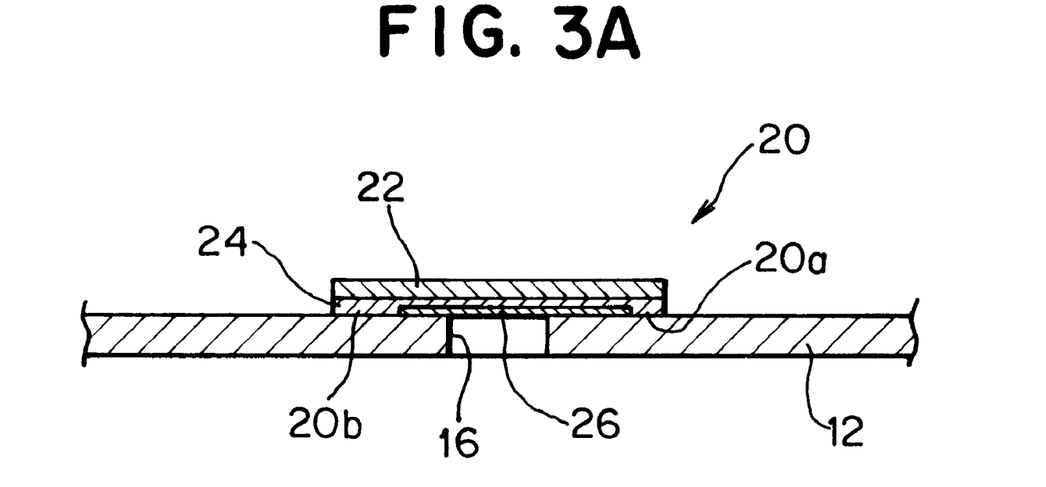
FIG. 3A is an enlarged cross-sectional view showing the structure of the pressure regulation valve of the food container shown in FIGS. 2A and 2B.
Figure 3B:
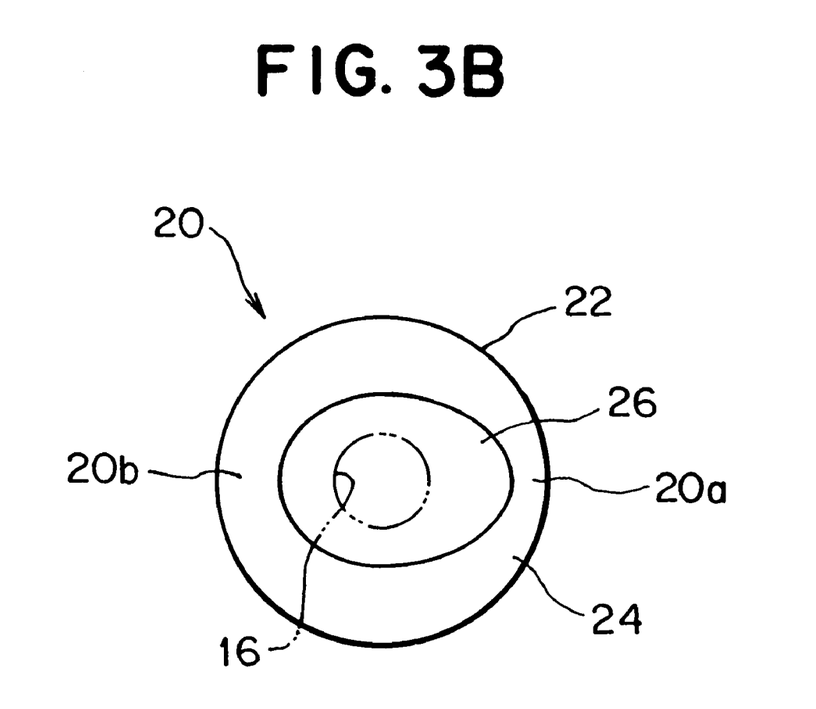
FIG. 3B is a bottom view of the pressure regulation valve.

As shown in FIGS. 3A and 3B, the pressure regulation valve 20 includes a cover film 22, an adhesive layer 24, and a separator film 26. The cover film 22 has a circular shape and has an area sufficient to cover the hole 16. The adhesive layer 24 is applied over the entire surface of the cover film 22 facing the upper sheet 12. The separator film 26 has an elliptical shape and is attached to the adhesive layer 24 to be disposed between the adhesive layer 24 and the upper sheet 12. The separator film 26 has an area larger than the cross sectional area of the hole 16 but smaller than the area of the cover film 22 or the adhesive layer 24.

Figure 6:
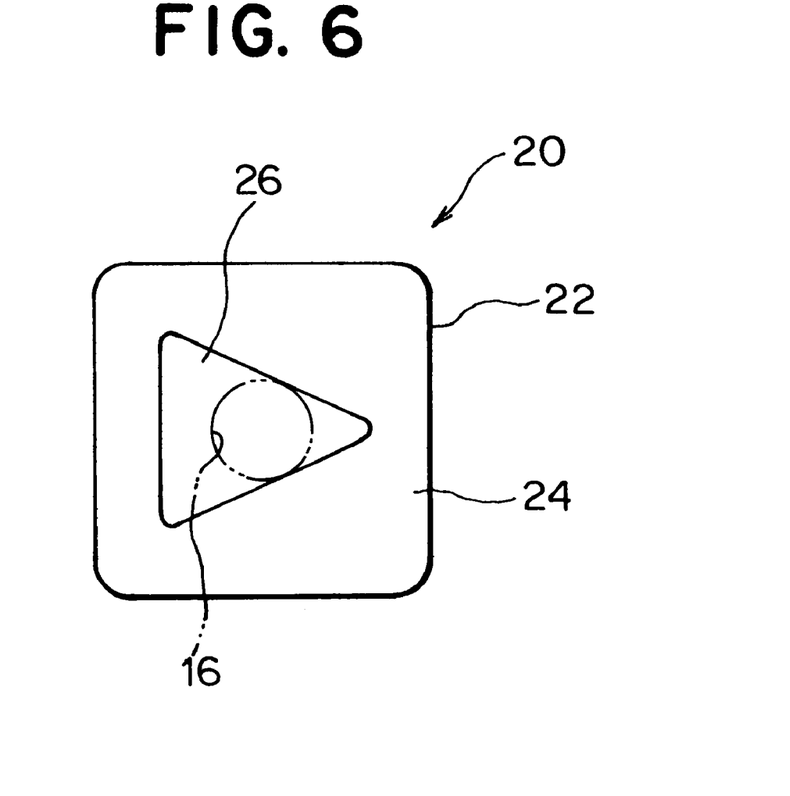
FIG. 6 shows another example of the shape of the cover film and the separator film of the pressure regulation valve.

FIG. 6 shows another example of the shape of the cover film 22 and the separator film 26 of the pressure regulation valve 20. In this example, the cover film 22 has a square shape while the separator film 26 has a triangular shape. Further, the cover film 22 may be elliptical, polygonal, or of any other shape. Similarly, the separator film 26 may be circular, elliptical, rectangular, or polygonal, or of any other shape. However, it is preferred that at least one circumferential position, the distance between the outer edge of the separator film 26 and the outer edge of the cover film 22 is made smaller than those at remaining circumferential positions. This arrangement enables reliable operation of the pressure regulation valve 20. In the example shown in FIGS. 3A and 3B, the cover film 22 first separates from the upper sheet 12 in an area 20a, where the distance between the outer edge of the separator film 26 and the outer edge of the cover film 22 is smallest, while in the opposite area 20b the cover film 22 does not separate from the upper sheet 12.

The cover film 22 is preferably formed of a synthetic paper such as UPO 80 (product of Oji Yuka Goseishi Co.). For example, the cover film 22 has a diameter of 10 mm and a thickness of about 80 μm.

The adhesive layer 24 is preferably formed of a acrylic adhesive such as PA-T1 (product of Lintec Corp.)

The separator film 26 is preferably formed of a polyethylene laminate such as 8LKY (product of Lintec. Corp). The separator film 26 preferably has a thickness of about 92 μm. Also, the separator film 26 preferably has a color such as blue. This facilitates the positioning of the pressure regulation valve 20 which will be described below.

Next, a method of manufacturing the pressure regulation valve 20 and the food container 10 will be described with reference to FIGS. 4A–4D.

Figure 4A:
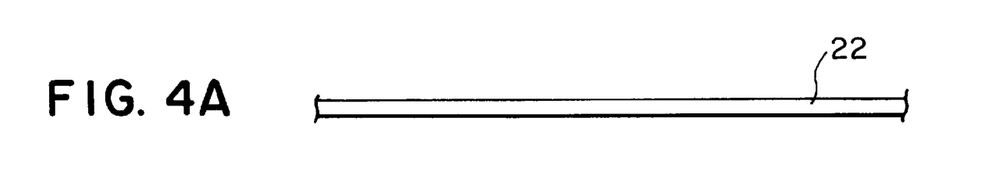
FIGS. 4A–4D are side views showing a method of manufacturing the pressure regulation valve.
Figure 4B:
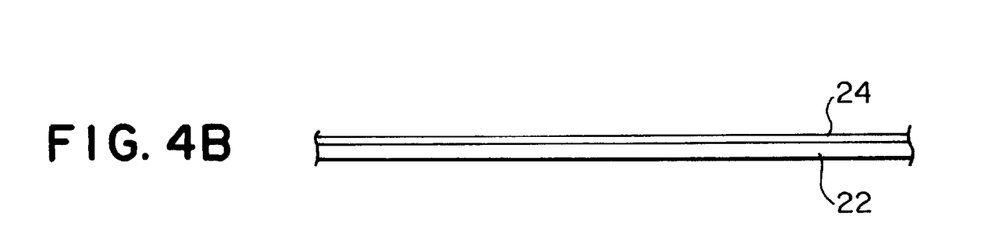
Figure 4C:
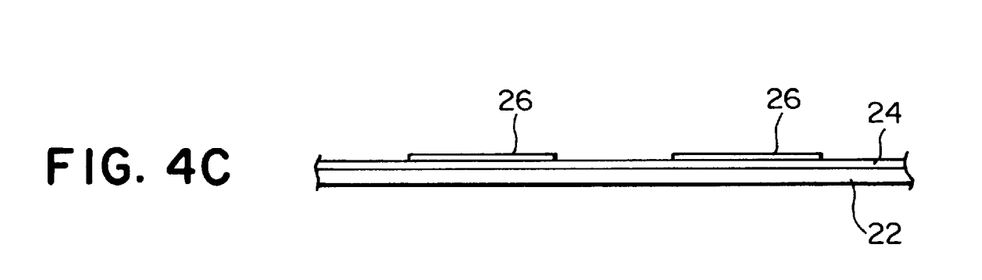
Figure 4D:
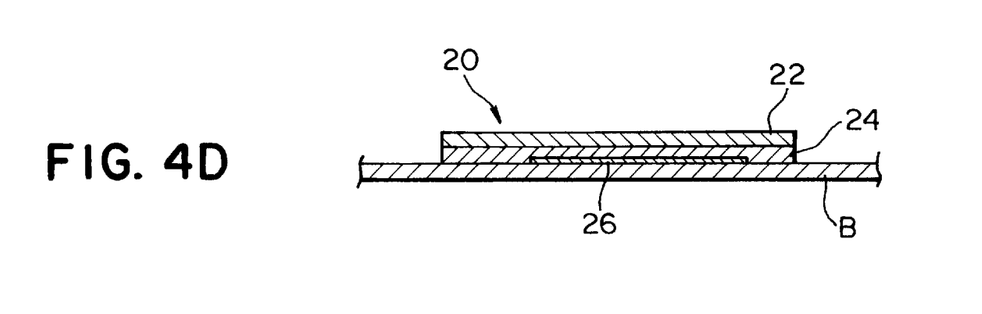

First, as shown in FIG. 4A, a synthetic sheet serving as the cover film 22 is provided, and as shown in FIG. 4B, acrylic adhesive is applied onto the synthetic sheet in order to form the adhesive layer 24. Subsequently, as shown in FIG. 4C, a predetermined number (e.g., 30) of separator films 26 are formed on the adhesive layer through a printing process. Subsequently, a support sheet B is placed on the separator films 26, and the laminar sheet is turned upside down. Then, circular cuts are formed in the laminar sheet, and the unnecessary portion is then removed in order to obtain 30 valve units 20 supported on the support sheet B, as shown in FIG. 4D. Thus, the pressure regulation valve 20 is manufactured.

After the sheets 12 and 14 are welded to form the food container 10, the hole 16 is formed in the upper sheet 12. Subsequently, the pressure regulation valve 20 removed from the support sheet B is attached to the upper sheet 12 at a position such that the hole 16 coincides with the separator film 24 (i.e., the blue area), as shown in FIG. 3B. Food 18 is then placed in the food container 10, and the opening of the food container 10 is closed through application of heat.

Figure 5:
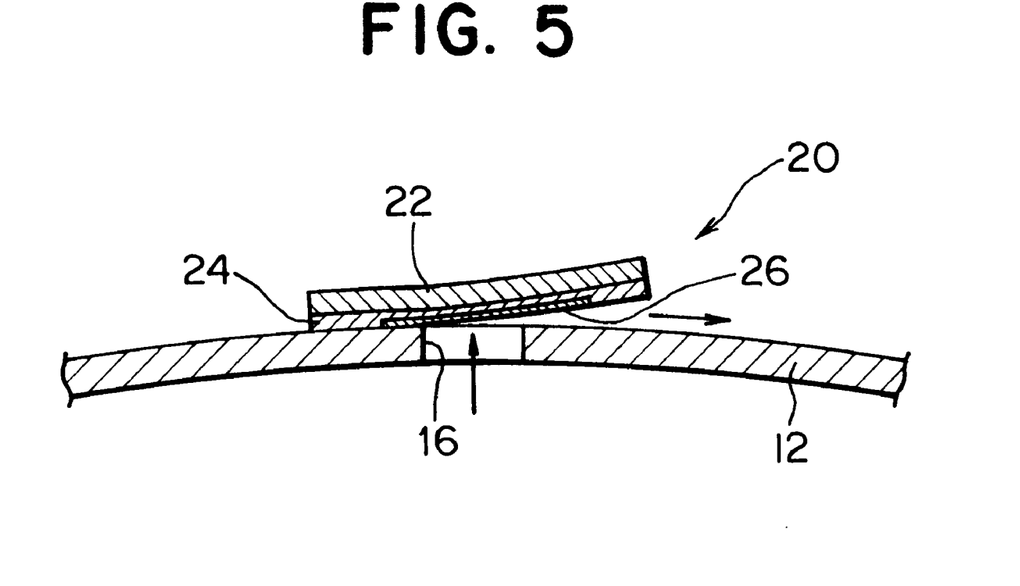
FIG. 5 is an enlarged cross-sectional view of the pressure regulation valve showing the operation of the pressure regulation valve.

When the food container 10 containing the food 18 is cooked in a microwave oven, the food 18 is heated so that moisture is produced from the food 18. Until the vapor pressure within the food container 10 reaches a predetermined level, the pressure regulation valve 20 remains closed. When the vapor pressure within the food container 10 reaches the predetermined level, as shown in FIG. 5, the cover film 22 partially separates from the upper sheet 12 of the food container 10 in order to relieve the vapor pressure. After completion of cooking, the food 18 is taken out of the food container 10 to be served.

Figure 7:
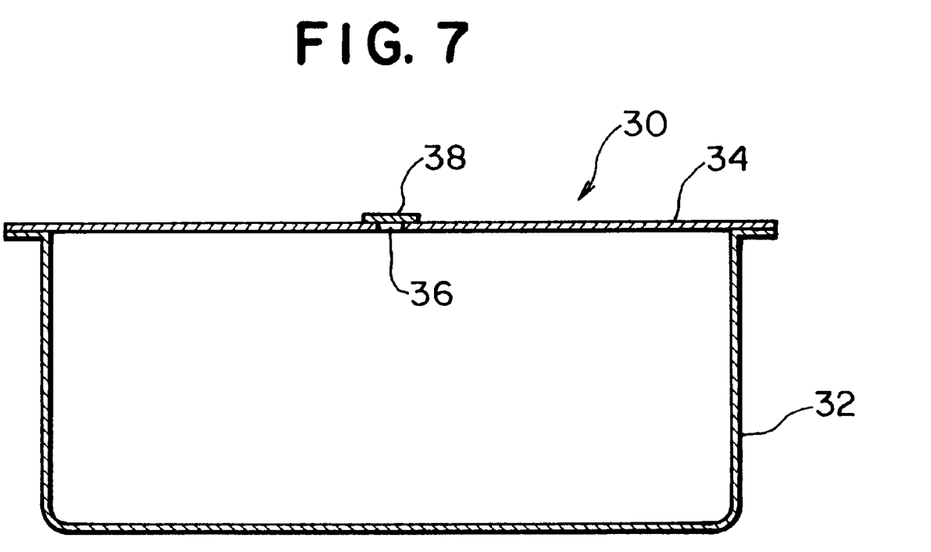
FIG. 7 is a cross-sectional view showing another food container according to the first embodiment of the present invention.
Figure 8:
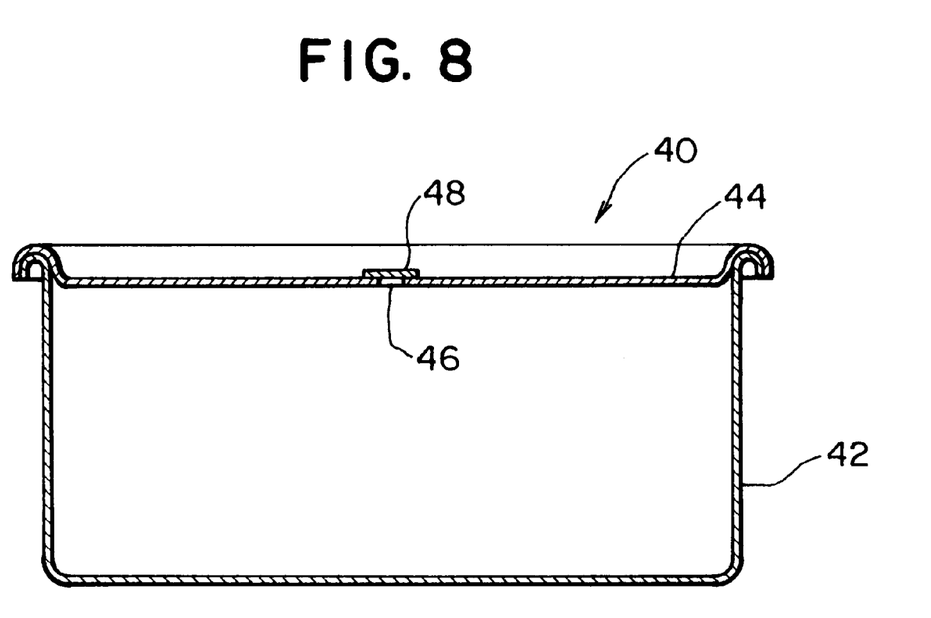
FIG. 8 is a cross-sectional view showing still another food container according to the first embodiment of the present invention.

FIGS. 7 and 8 show different types of food containers according to the first embodiment of the present invention. The food container 30 shown in FIG. 7 includes a rectangular body 32 and a flat cover sheet 34 bonded to the body 32 through the peripheral edge thereof. A hole 36 is formed in the cover sheet 34, and a pressure regulation valve 38 having the same structure as that of the pressure regulation valve 20 is attached to the cove sheet 34 to close the hole 36.

The food container 40 shown in FIG. 8 includes a cylindrical body 42 and a circular lid 44 that Is removably engaged with the body 42. A hole 46 is formed in the lid 44, and a pressure regulation valve 48 having the same structure as that of the pressure regulation valve 20 Is attached to the lid 44 to close the hole 46.

Second Embodiment

Figure 9A:
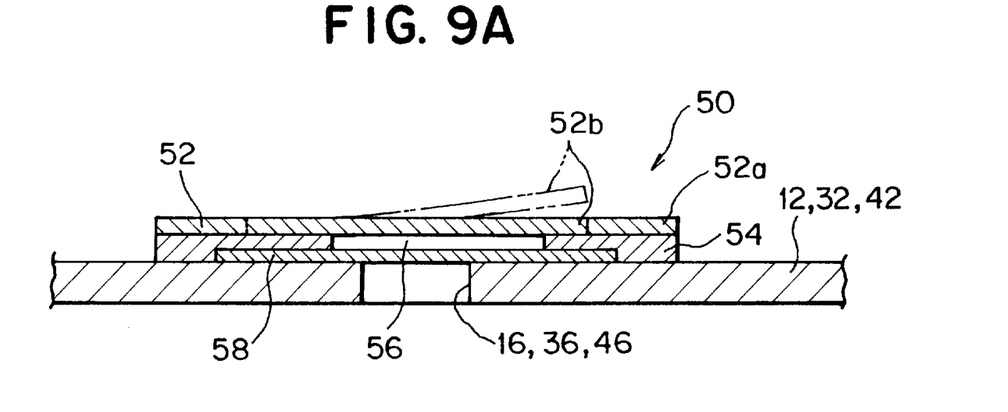
FIG. 9A is an enlarged cross-sectional view of a pressure regulation valve according to a second embodiment of the present invention.
Figure 9B:
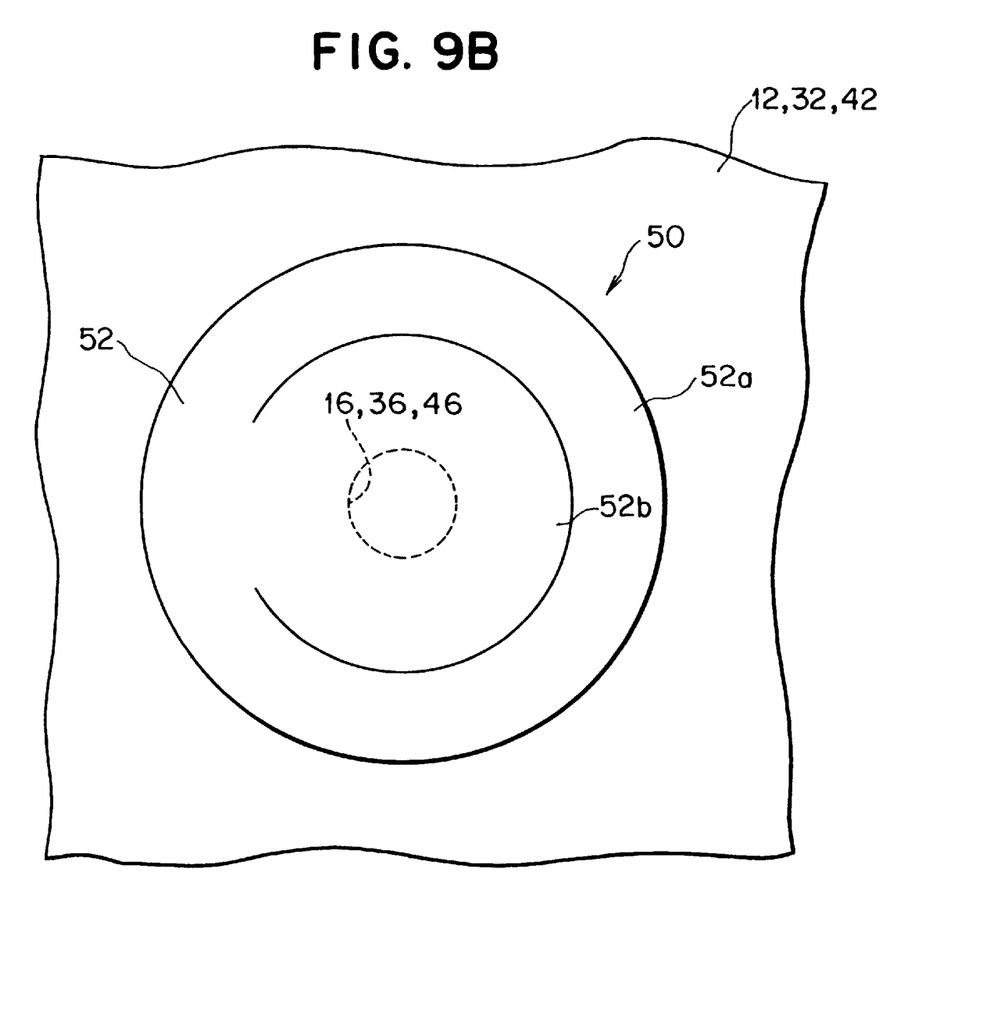
FIG. 9B is a plan view of the pressure regulation valve according to the second embodiment.

FIGS. 9A and 9B show a food container according to a second embodiment of the present invention. The food container of this embodiment has the same structure as that of the first embodiment shown In FIGS. 2A, 7, and 8. However, the structure of a pressure regulation valve 50 differs from that of the pressure regulation valve 20. The pressure regulation valve 50 includes a cover film 52, an adhesive layer 54, and a gas-permeable film 58. The gas-permeable film 58 has an area sufficient to cover the hole 16 (36, 46). The gas-permeable film 58 is formed of a material capable of preventing passage of water while allowing passage of air. Examples of such a material include Poreful (product of Ohe Chemical Co.), Microtex (product of Nitto Denko Corp.), Permilan (product of Maruzen Corp.), and Espore (product of Mitsui Chemical Co.). The cover film 52 has an area sufficient to cover the gas-permeable film 58. The cover film 52 has a stationary peripheral portion 52a corresponding to the peripheral portion of the gas-permeable film 58 and a valve portion 52b corresponding to the central portion of the gas-permeable film 58. The adhesive layer 54 is disposed between the cover film 52 and the container to bond the cover film 52 to the container with the gas-permeable film 58 interposed therebetween. A non-adhesive area 56 is formed in the adhesive layer 54 at a position corresponding to the valve portion 52b of the cover film 52.

The cover film 52 and the adhesive layer 54 are formed of the same materials as used for the cover film 22 and the adhesive layer 24 of the pressure regulation valve 20 of the first embodiment.

The pressure regulation valve 50 of the present embodiment is manufactured in the same manner as that for the pressure regulation valve 20 of the first embodiment.

When food contained in the food container—to which the pressure regulation valve 50 is attached—is cooked in a microwave oven, the food is heated so that moisture is produced from the food. Until the vapor pressure within the food container reaches a predetermined level, the pressure regulation valve 50 remains closed. When the vapor pressure within the food container reaches the predetermined level, as indicated by a two-dot chain line in FIG. 9A, the valve portion 52b of the cover film 52 separates from the gas-permeable film 58 in order to relieve the vapor pressure via the gas-permeable film 58.

Even when food produces liquid upon being cooked or when liquid such as soup contained in the food container together with food boils, the gas-permeable film 56 prevents such liquid from spouting outside through the hole 16 (36, 46).

Third Embodiment

Figure 10A:
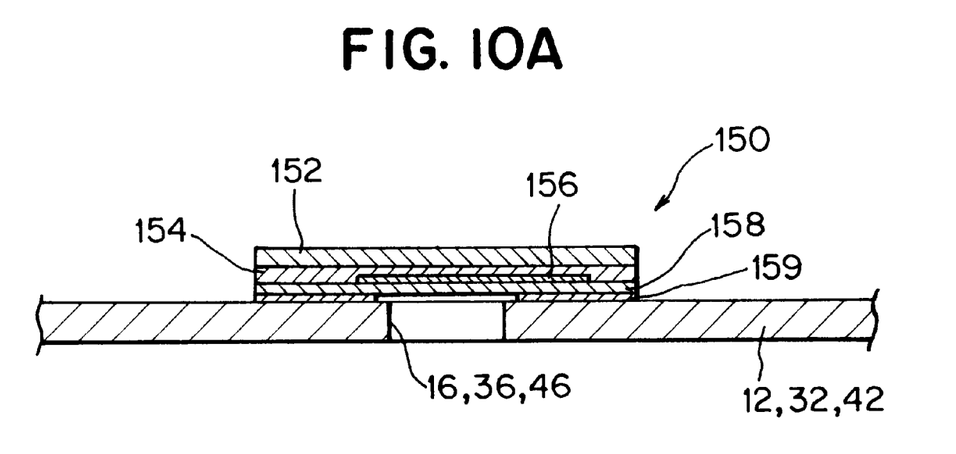
FIG. 10A is an enlarged cross-sectional view of a pressure regulation valve according to a third embodiment of the present invention.
Figure 10B:
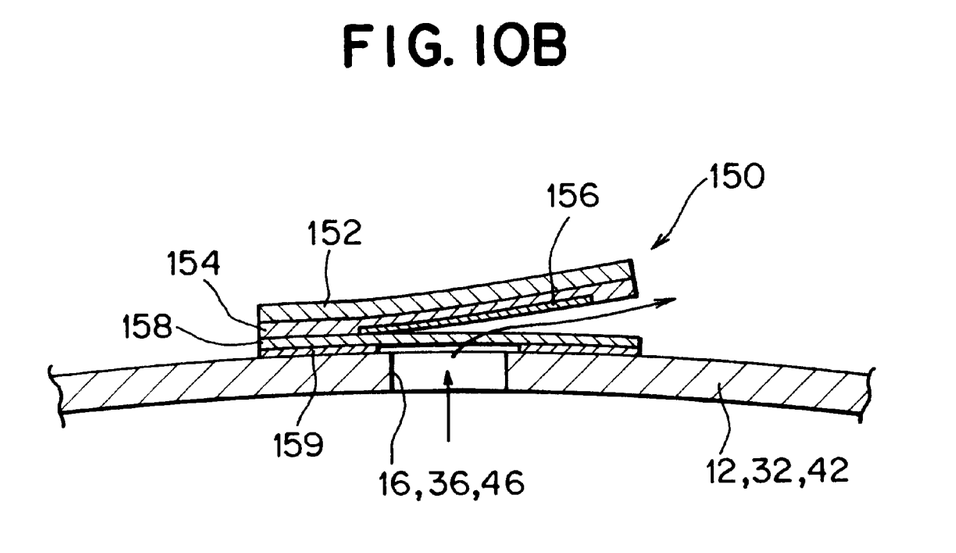
FIG. 10B is an enlarged cross-sectional view of the pressure regulation valve according to the third embodiment, showing the operation of the pressure regulation valve.

FIGS. 10A and 10B show a food container according to a third embodiment of the present invention. The pressure regulation valve 150 of the present embodiment includes a gas-permeable film 158, a first adhesive layer 159, a cover film 152, a second adhesive film 154, and a separator film 156. The gas-permeable film 158 has an area sufficient to cover the hole 16 (36, 46) and is adapted to prevent passage of water while allowing passage of air. The first adhesive layer 159 disposed between the gas-permeable film 158 and the container 12 (32, 42) in order to bond the first gas-permeable film 158 to the container 12 (32, 42). The cover film 152 has an area equal to that of the gas-permeable film 159. The second adhesive layer 154 is disposed between the cover film 152 and the gas-permeable film 158 in order to bond the cover film 152 to the gas-permeable film 158. The separator film 156 is disposed between the second adhesive layer 154 and the gas-permeable film 158 and has an area larger than that of the hole 16 (36, 46) but smaller than that of the cover film 152.

The cover film 152, the first and second adhesive layer 154 and 159, and the separator film 156 are formed of the same materials as used for the cover film 22, the adhesive layer 24, and the separator film 26 of the pressure regulation valve 20 of the first embodiment.

The pressure regulation valve 150 of the present embodiment is manufactured in the same manner as that for the pressure regulation valve 20 of the first embodiment.

When food contained in the food container—to which the pressure regulation valve 150 is attached—is cooked in a microwave oven, the food is heated so that moisture is produced from the food. Until the vapor pressure within the food container reaches a predetermined level, the pressure regulation valve 150 remains closed. When the vapor pressure within the food container reaches the predetermined level, as shown in FIG. 10B, the cover film 152 separates from the gas-permeable film 158 in order to relieve the vapor pressure.

Even when food produces liquid upon being cooked or when liquid such as soup contained in the food container together with food boils, the gas-permeable film 158 prevents such liquid from spouting outside through the hole 16 (36, 46).

Fourth Embodiment

Figure 11:
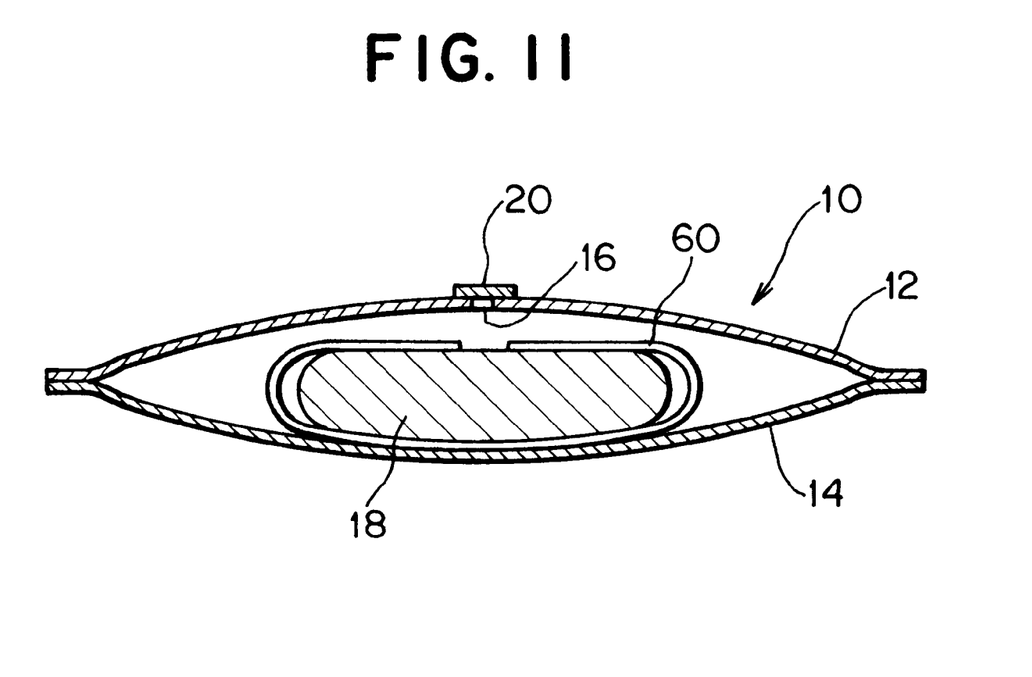
FIG. 11 is a cross-sectional view of a food container according to a fourth embodiment of the present invention.
Figure 12:
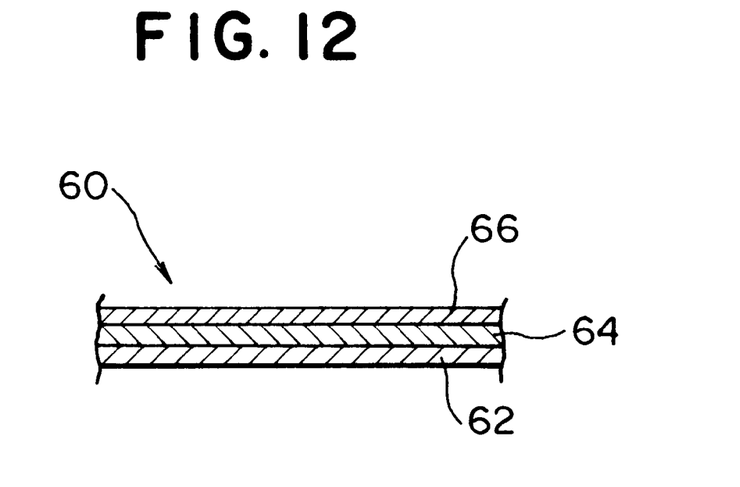
FIG. 12 is an enlarged cross-sectional view showing the structure of an electrically conductive sheet used in the fourth embodiment of the present invention.

FIG. 11 shows a food container according to a fourth embodiment of the present invention. The food container of the present embodiment has the same structure as that of the first embodiment shown in FIGS. 2A, 7, and 8. In the present embodiment, the pressure regulation valve 20 of the first embodiment may be used. Alternatively, the pressure regulation valve 50 of the second embodiment or the pressure regulation valve 150 of the third embodiment may be used. In the present embodiment, the food container further includes an electrically conductive film 60 for browning food through burning. As shown in FIG. 12, the film 60 has a layered structure including a base layer 62, an electrically conductive layer 64 vacuum-deposited on the base layer 62, and a protection layer 66 superposed on the conductive layer 64. Details of such a conductive film is disclosed in, for example, U.S. Pat. Nos. 5,412,187, 5,489,766, and 5,530,231. The electrically conductive film 60 is wound around food such that the protection layer 66 comes into contact with the food.

Figure 13:
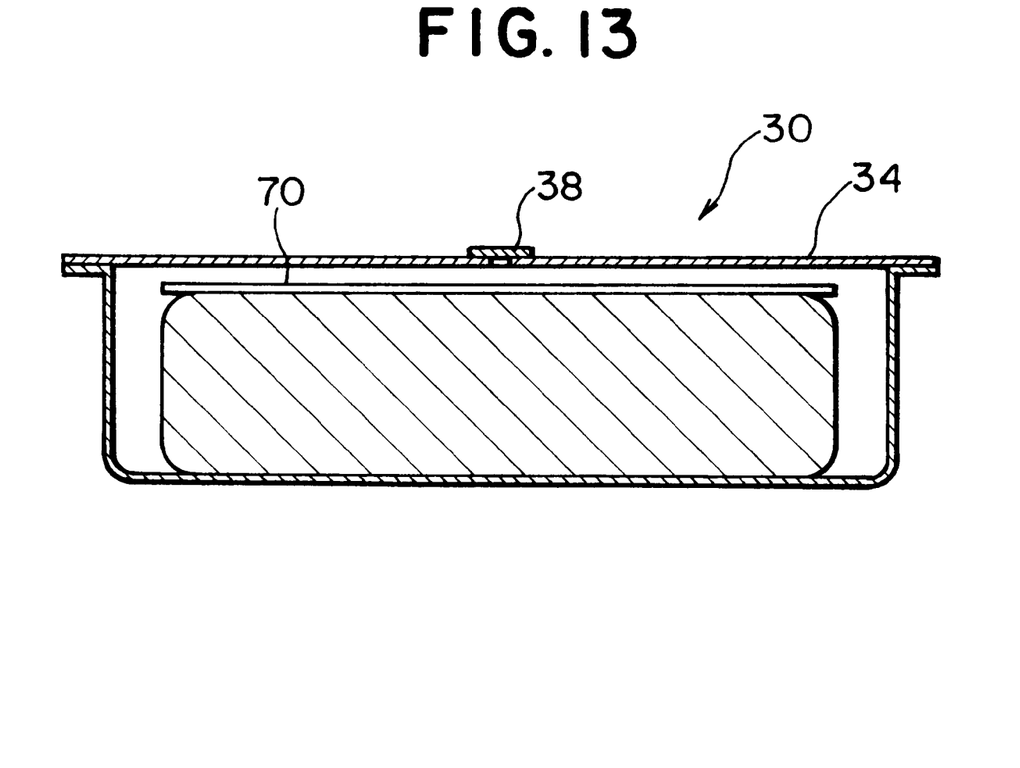
FIG. 13 is a cross-sectional view of another food container according to the fourth embodiment of the present invention.
Figure 14:
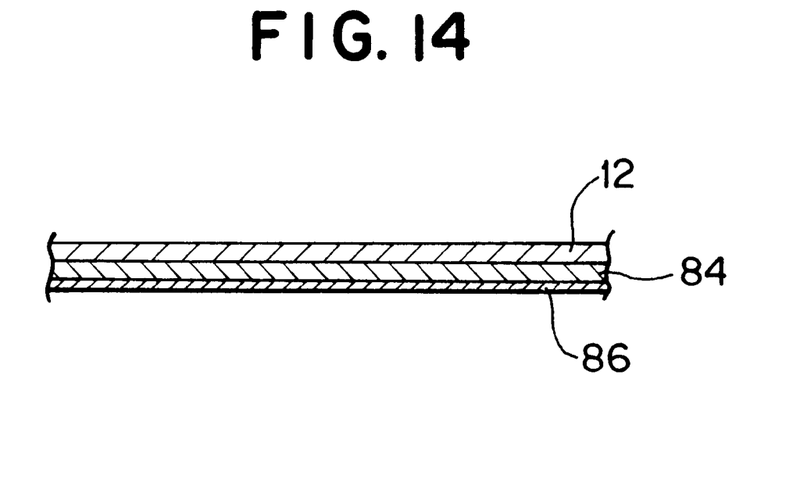
FIG. 14 is a cross-sectional view of still another food container according to the fourth embodiment of the present invention.

FIG. 13 shows another food container according to the fourth embodiment, which has a structure similar to that of the food container shown in FIG. 7. An electrically conductive film 70 is placed on food. FIG. 14 shows still another food container according to the fourth embodiment, which has a structure basically the same as that of the food container shown in FIG. 2A. However, in the food container shown in FIG. 14, an electrically conductive layer 84 is formed on the inner surface of the upper sheet 12 of the food container, and a protection layer 86 is superposed on the electrically conductive layer 84.

Fifth Embodiment

Figure 15A:
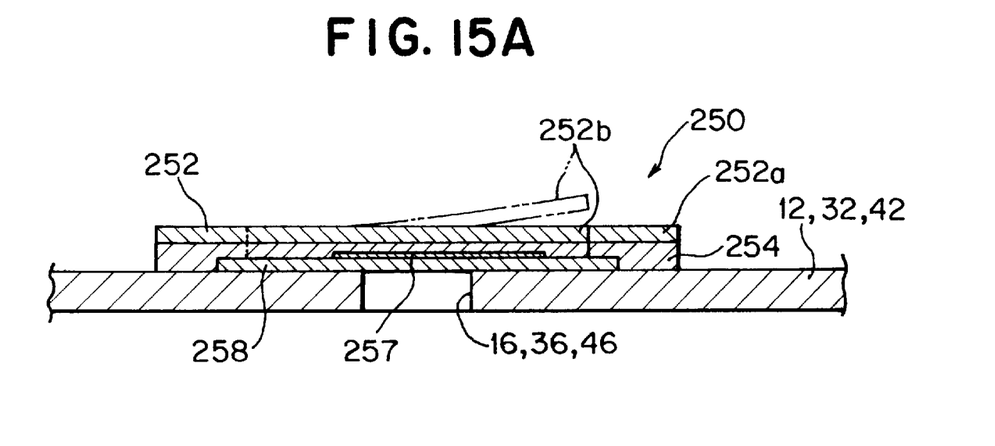
FIG. 15A is an enlarged cross-sectional view of a pressure regulation valve according to a fifth embodiment of the present invention.
Figure 15B:
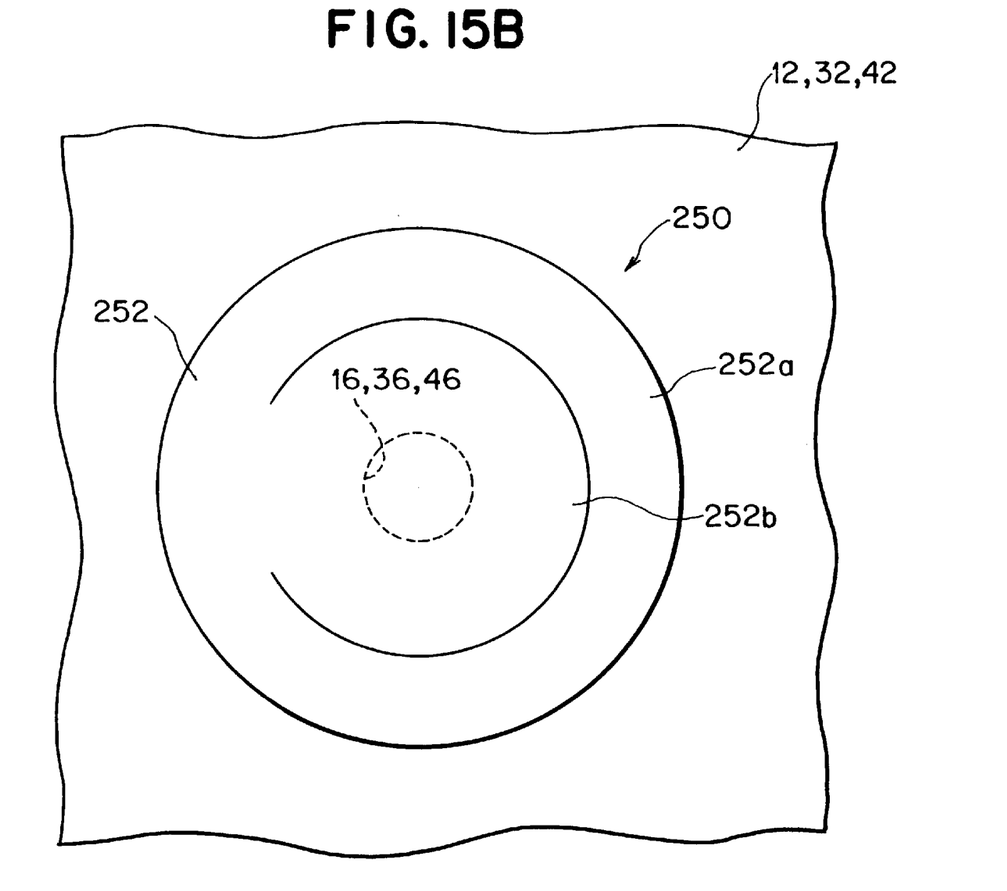
FIG. 15B is an enlarged cross-sectional view of the pressure regulation valve according to the fifth embodiment, showing the operation of the pressure regulation valve.

FIGS. 15A and 15B show a food container according to a fifth embodiment of the present invention. The food container of this embodiment has the same structure as that of the first embodiment shown in FIGS. 2A, 7, and 8. However, the structure of a pressure regulation valve 250 differs from that of the pressure regulation valve 20. The pressure regulation valve 250 includes a cover film 252, an adhesive layer 254, a separator film 257, and a gas-permeable film 258. The gas-permeable film 258 has an area sufficient to cover the hole 16 (36, 46). The gas-permeable film 258 is formed of a material capable of preventing passage of water while allowing passage of air. Examples of such a material include Poreful (product of Ohe Chemical Co.), Microtex (product of Nitto Denko Corp.), Permilan (product of Maruzen Corp.), and Espore (product of Mitsui Chemical Co.). The cover film 252 has an area sufficient to cover the gas-permeable film 258. The cover film 252 has a stationary peripheral portion 252a corresponding to the peripheral portion of the gas-permeable film 258 and a valve portion 252b corresponding to the central portion of the gas-permeable film 258. The adhesive layer 254 is disposed between the cover film 252 and the container to bond the cover film 252 to the container with the gas-permeable film 258 interposed therebetween. The separator film 257 is disposed between the adhesive layer 254 and the gas-permeable film 258. The separator film 257 has an area larger than that of the hole 16 (36, 46) but smaller than that of the valve portion 252b of the cover film 252.

The cover film 252, the adhesive layer 254, the separator film 257 are formed of the same materials as used for the cover film 22, the adhesive layer 24, and the separator film 26 of the pressure regulation valve 20 of the first embodiment.

The pressure regulation valve 250 of the present embodiment is manufactured in the same manner as that for the pressure regulation valve 20 of the first embodiment.

When food contained in the food container—to which the pressure regulation valve 250 is attached—is cooked in a microwave oven, the food is heated so that moisture is produced from the food. Until the vapor pressure within the food container reaches a predetermined level, the pressure regulation valve 250 remains closed. When the vapor pressure within the food container reaches the predetermined level, as indicated by a two-dot chain line in FIG. 15A, the valve portion 252b of the cover film 252, together with a part of the adhesive layer 245 and the separator film 257, separates from the gas-permeable film 258 in order to relieve the vapor pressure via the gas-permeable film 258.

Even when food produces liquid upon being cooked or when liquid such as soup contained in the food container together with food boils, the gas-permeable film 258 prevents such liquid from spouting outside through the hole 16 (36, 46).

Obviously, numerous modifications and variations of the present invention are possible in light of the above teachings. It is therefore to be understood that within the scope of the appended claims, the present invention may be practiced otherwise than as specifically described herein.

What is claimed is:

1. A food container for cooking in a microwave oven, comprising a container adapted to contain food and having a hole and a pressure regulation valve attached to the container to close the hole, wherein the pressure regulation valve comprises:

a cover film having an area sufficient to cover the hole;

an adhesive layer applied over the surface of the cover film facing the container; and a separator film disposed between the adhesive layer and the container and having an area larger than that of the hole but smaller than that of the cover film.

2. A food container according to claim 1, further comprising an electrically conductive film for browning food through burning.

3. A food container for cooking in a microwave oven, comprising a container adapted to contain food and having a hole and a pressure regulation valve attached to the container to close the hole, wherein the pressure regulation valve comprises:

a gas-permeable film having an area sufficient to cover the hole and adapted to prevent passage of water while allowing passage of air;

a cover film having an area sufficient to cover the gas-permeable film and having a stationary peripheral portion corresponding to a peripheral portion of the gas-permeable film and a valve portion corresponding to a central portion of the gas-permeable film; and an adhesive layer disposed between the cover film and the container to bond the cover film to the container with the gas-permeable film interposed therebetween, wherein a non-adhesive area is formed in the adhesive layer at a position corresponding to the valve portion of the cover film.

4. A food container according to claim 3, further comprising an electrically conductive film for browning food through burning.

5. A food container for cooking in a microwave oven, comprising a container adapted to contain a food and having a hole and a pressure adjustment valve attached to the container to close the hole, wherein the pressure regulation valve comprises:

a gas-permeable film having an area sufficient to cover the hole and adapted to prevent passage of water while allowing passage of air;

a first adhesive layer disposed between the gas-permeable film and the container in order to bond the first gas-permeable film to the container;

a cover film having an area sufficient to cover the gas-permeable film;

a second adhesive layer disposed between the cover film and the gas-permeable film in order to bond the cover film to the gas-permeable film; and a separator film disposed between the second adhesive layer and the gas-permeable film and having an area larger than that of the hole but smaller than that of the cover film.

6. A food container according to claim 5, further comprising an electrically conductive film for browning food through burning.

7. A food container for cooking in a microwave oven, comprising a container adapted to contain food and having a hole and a pressure regulation valve attached to the container to close the hole, wherein the pressure regulation valve comprises:

a gas-permeable film having an area sufficient to cover the hole and adapted to prevent passage of water while allowing passage of air;

a cover film having an area sufficient to cover the gas-permeable film and having a stationary peripheral portion corresponding to a peripheral portion of the gas-permeable film and a valve portion corresponding to a central portion of the gas-permeable film;

an adhesive layer disposed between the cover film and the container to bond the cover film to the container with the gas-permeable film interposed therebetween; and a separator film disposed between the adhesive layer and the gas-permeable film and having an area larger than that of the hole but smaller than that of the valve portion of the cover film.

8. A food container according to claim 7, further comprising an electrically conductive film for browning food through burning.

* * * * *